(12) United States Patent
Humle et al.

(10) Patent No.: US 9,573,126 B2
(45) Date of Patent: Feb. 21, 2017

(54) PHOTOCATALYTIC COMPOSITION

(71) Applicant: Välinge Photocatalytic AB, Viken (SE)

(72) Inventors: Michael Humle, Vallensbæk Strand (DK); Simon Lausten Østergaard, Copenhagen V (DK)

(73) Assignee: Valinge Photocatalytic AB, Viken (SE)

( * ) Notice: Subject to any disclaimer, the term of this patent is extended or adjusted under 35 U.S.C. 154(b) by 0 days.

(21) Appl. No.: 14/386,063

(22) PCT Filed: Mar. 15, 2013

(86) PCT No.: PCT/SE2013/050283
§ 371 (c)(1),
(2) Date: Sep. 18, 2014

(87) PCT Pub. No.: WO2013/141789
PCT Pub. Date: Sep. 26, 2013

(65) Prior Publication Data
US 2015/0102258 A1   Apr. 16, 2015

(30) Foreign Application Priority Data

Mar. 20, 2012  (DK) .................................. 2012 70126

(51) Int. Cl.
*B01J 31/38* (2006.01)
*C09D 1/00* (2006.01)
(Continued)

(52) U.S. Cl.
CPC .............. *B01J 31/38* (2013.01); *B01J 21/063* (2013.01); *B01J 23/42* (2013.01); *B01J 35/004* (2013.01);
(Continued)

(58) Field of Classification Search
CPC ................................ B01J 21/063; B01J 35/004
(Continued)

(56) References Cited

U.S. PATENT DOCUMENTS 3,798,111 A   3/1974   Lane et al.
3,932,342 A   1/1976   Nagata et al.
(Continued)

FOREIGN PATENT DOCUMENTS

BE   1015862 A6   10/2005
BE   1017168 A5   3/2008
(Continued)

OTHER PUBLICATIONS

U.S. Appl. No. 14/494,957, Persson, et al.
(Continued)

*Primary Examiner* — Patricia L Hailey
(74) *Attorney, Agent, or Firm* — Buchanan Ingersoll & Rooney P.C.

(57) ABSTRACT

The present disclosure relates to a photocatalytic composition comprising photocatalytic titanium dioxide particles being dispersed in a continuous phase, and at least one anti-photogreying additive, wherein said at least one anti-photogreying additive is adapted to limit photogreying of said titanium dioxide particles while the photocatalytic activity of said titanium dioxide particles is maintained, and wherein the photo greying index (ΔL) of said composition is less than 6.

32 Claims, 4 Drawing Sheets (51) Int. Cl.

| | |
|---|---|
| *B01J 21/06* | (2006.01) |
| *B01J 23/42* | (2006.01) |
| *B01J 35/00* | (2006.01) |
| *B01J 37/00* | (2006.01) |
| *B01J 37/02* | (2006.01) |
| *C09D 5/16* | (2006.01) |
| *C09D 7/12* | (2006.01) |
| *C09D 183/12* | (2006.01) |
| *C08K 3/20* | (2006.01) |
| *C08K 3/22* | (2006.01) |

(52) U.S. Cl.
CPC ........... *B01J 35/006* (2013.01); *B01J 37/0018* (2013.01); *B01J 37/0201* (2013.01); *B01J 37/0209* (2013.01); *C08K 3/20* (2013.01); *C09D 1/00* (2013.01); *C09D 5/1618* (2013.01); *C09D 7/1241* (2013.01); *C09D 183/12* (2013.01); *B01J 2231/70* (2013.01); *C08K 2003/2241* (2013.01)

(58) Field of Classification Search
USPC ........................................................ 502/350
See application file for complete search history.

(56) References Cited

U.S. PATENT DOCUMENTS

| | | | |
|---|---|---|---|
| 5,439,514 A | 8/1995 | Kashiwazaki et al. | |
| 5,679,138 A | 10/1997 | Bishop et al. | |
| 5,714,269 A | 2/1998 | Muñz Madrid | |
| 5,853,830 A | 12/1998 | McCaulley et al. | |
| 5,882,246 A | 3/1999 | Inkyo et al. | |
| 6,162,842 A | 12/2000 | Freche | |
| 6,228,480 B1 | 5/2001 | Kimura et al. | |
| 6,284,314 B1 | 9/2001 | Kato et al. | |
| 6,299,981 B1 | 10/2001 | Azzopardi et al. | |
| 6,409,821 B1 | 6/2002 | Cassar et al. | |
| 6,436,159 B1 | 8/2002 | Safta et al. | |
| 6,666,913 B2 | 12/2003 | Hirano et al. | |
| 6,740,312 B2* | 5/2004 | Chopin ................ A61K 8/11 106/436 | |
| 6,835,421 B1 | 12/2004 | Döhring | |
| 8,568,870 B2 | 10/2013 | Imai et al. | |
| 8,652,646 B2 | 2/2014 | Heukelbach et al. | |
| 9,375,750 B2 | 6/2016 | Reenberg et al. | |
| 2002/0005145 A1 | 1/2002 | Sherman | |
| 2002/0006425 A1 | 1/2002 | Takaoka et al. | |
| 2002/0042343 A1 | 4/2002 | Akui et al. | |
| 2002/0108640 A1 | 8/2002 | Barger et al. | |
| 2003/0162658 A1 | 8/2003 | Domen et al. | |
| 2003/0236317 A1 | 12/2003 | Sakatani et al. | |
| 2004/0067703 A1 | 4/2004 | Grunden et al. | |
| 2004/0081818 A1 | 4/2004 | Baumann et al. | |
| 2004/0197682 A1 | 10/2004 | Sonehara et al. | |
| 2004/0251329 A1 | 12/2004 | Hsu et al. | |
| 2004/0253172 A1 | 12/2004 | Jung et al. | |
| 2005/0069706 A1* | 3/2005 | Kessell ................ A61K 8/11 428/403 | |
| 2005/0145939 A1 | 7/2005 | Okada et al. | |
| 2005/0191505 A1 | 9/2005 | Akarsu et al. | |
| 2005/0233893 A1 | 10/2005 | Sakatani et al. | |
| 2006/0003013 A1 | 1/2006 | Dobbs | |
| 2006/0014050 A1 | 1/2006 | Gueneau et al. | |
| 2007/0272382 A1 | 11/2007 | Becker et al. | |
| 2008/0044483 A1 | 2/2008 | Kessell | |
| 2008/0260626 A1* | 10/2008 | Bloss ................ B01J 21/063 423/610 | |
| 2009/0025508 A1 | 1/2009 | Liao et al. | |
| 2009/0136861 A1 | 5/2009 | Mitsumori et al. | |
| 2009/0142604 A1 | 6/2009 | Imai et al. | |
| 2009/0180976 A1 | 7/2009 | Seeney et al. | |
| 2009/0191273 A1* | 7/2009 | Kessell ................ A61K 8/26 424/489 | |
| 2009/0208646 A1 | 8/2009 | Kreuder et al. | |
| 2009/0286068 A1 | 11/2009 | Niguma et al. | |
| 2009/0317624 A1 | 12/2009 | Yoshioka et al. | |
| 2010/0031450 A1* | 2/2010 | Wattebled ................ C11D 3/0063 8/137 | |
| 2010/0058954 A1 | 3/2010 | Kisch | |
| 2010/0112359 A1 | 5/2010 | Sharma et al. | |
| 2010/0113254 A1 | 5/2010 | Sato et al. | |
| 2010/0203308 A1 | 8/2010 | Mennig et al. | |
| 2010/0297434 A1 | 11/2010 | Iversen et al. | |
| 2011/0083726 A1 | 4/2011 | Takayanagi et al. | |
| 2011/0095242 A1 | 4/2011 | Jin et al. | |
| 2011/0123814 A1 | 5/2011 | Heukelbach et al. | |
| 2011/0136660 A1* | 6/2011 | Terasaki ................ B01J 21/06 502/159 | |
| 2011/0136928 A1 | 6/2011 | Dipietro et al. | |
| 2011/0189471 A1 | 8/2011 | Ziegler et al. | |
| 2012/0064787 A1 | 3/2012 | Brummerstedt Iversen et al. | |
| 2013/0011684 A1 | 1/2013 | Jensen et al. | |
| 2013/0177504 A1* | 7/2013 | Macoviak ................ A61K 8/29 424/10.3 | |
| 2013/0216458 A1* | 8/2013 | Nagae ................ B01J 21/066 423/210 | |
| 2014/0178694 A1 | 6/2014 | Reenberg et al. | |
| 2015/0083319 A1* | 3/2015 | Persson ................ D21H 17/74 156/279 | |
| 2015/0343486 A1 | 12/2015 | Jensen et al. | |

FOREIGN PATENT DOCUMENTS

| | | |
|---|---|---|
| CN | 1445312 A | 10/2003 |
| CN | 1662465 A | 8/2005 |
| DE | 10 2004 032 058 A1 | 5/2005 |
| DE | 10 2007 054 848 A1 | 5/2009 |
| EP | 0 684 507 A2 | 11/1995 |
| EP | 0 684 507 A3 | 11/1995 |
| EP | 0 913 447 A1 | 5/1999 |
| EP | 0 684 507 B1 | 9/1999 |
| EP | 0 947 469 A2 | 10/1999 |
| EP | 1 371 693 A2 | 12/2003 |
| EP | 1 541 231 A1 | 6/2005 |
| EP | 1 541 638 A1 | 6/2005 |
| EP | 1 577 009 A1 | 9/2005 |
| EP | 1 760 116 A1 | 3/2007 |
| FR | 2 789 591 A1 | 8/2000 |
| JP | 2002-011827 A | 1/2002 |
| JP | 2002-146283 A | 5/2002 |
| JP | 2002-177792 A | 6/2002 |
| JP | 2003-071967 A | 3/2003 |
| JP | 2005-281017 A | 10/2005 |
| JP | 2007-176753 A | 7/2007 |
| JP | 2008-261093 A | 10/2008 |
| WO | WO 96/39251 A1 | 12/1996 |
| WO | WO 97/00134 A1 | 1/1997 |
| WO | WO 97/30130 A1 | 8/1997 |
| WO | WO 98/23549 A1 | 6/1998 |
| WO | WO 00/44984 A1 | 8/2000 |
| WO | WO 02/08518 A1 | 1/2002 |
| WO | WO 02/064266 A2 | 8/2002 |
| WO | WO 03/016219 A1 | 2/2003 |
| WO | WO 03/087002 A1 | 10/2003 |
| WO | WO 2004/005577 A2 | 1/2004 |
| WO | WO 2004/069400 A1 | 8/2004 |
| WO | WO 2005/045131 A1 | 5/2005 |
| WO | WO 2005/066286 A1 | 7/2005 |
| WO | WO 2005/068181 A1 | 7/2005 |
| WO | WO 2007/015669 A2 | 2/2007 |
| WO | WO 2007/015669 A3 | 2/2007 |
| WO | WO 2007/069596 A | 6/2007 |
| WO | WO 2007/072008 A2 | 6/2007 |
| WO | WO 2007/097284 A1 | 8/2007 |
| WO | WO 2007/135987 A1 | 11/2007 |
| WO | WO 2007/144718 A2 | 12/2007 |
| WO | WO 2007/144718 A3 | 12/2007 |
| WO | WO 2008/040730 A1 | 4/2008 |
| WO | WO 2008/117655 A1 | 10/2008 |
| WO | WO 2008/128818 A1 | 10/2008 |
| WO | WO 2009/021524 A1 | 2/2009 |
| WO | WO 2009/024285 A1 | 2/2009 |

(56) References Cited

FOREIGN PATENT DOCUMENTS

| | | |
|---|---|---|
| WO | WO 2009/062516 A2 | 5/2009 |
| WO | WO 2009/062516 A3 | 5/2009 |
| WO | WO 2009/065769 A2 | 5/2009 |
| WO | WO 2009/065769 A3 | 5/2009 |
| WO | WO 2009/124704 A1 | 10/2009 |
| WO | WO 2009/145209 A1 | 12/2009 |
| WO | WO 2009/157449 A1 | 12/2009 |
| WO | WO 2010/001669 A1 | 1/2010 |
| WO | WO 2010/110726 A1 | 9/2010 |
| WO | WO 2011/075837 A1 | 6/2011 |
| WO | WO 2011/093785 A1 | 8/2011 |
| WO | WO 2012/014893 A1 | 2/2012 |
| WO | WO 2013/006125 A1 | 1/2013 |
| WO | WO 2013/141789 A1 | 9/2013 |

OTHER PUBLICATIONS

International Search Report issued in PCT/SE2013/050283, mailed Jul. 8, 2013, ISA/SE, Patent-och registreringsverket, Stockholm, SE, 4 pages.

Inkyo, Mitsugi, et al., "Beads Mill-Assisted Synthesis of Poly Methyl Methacrylate (PMMA)-TiO$_2$ Nanoparticle Composites," *Ind. Eng. Chem. Res.*, 2008, pp. 2597-2604, vol. 47, No. 8, American Chemical Society, USA (published on the web Mar. 14, 2008).

Inkyo, Mitsugi, et al., "Experimental investigation of nanoparticle dispersion by beads milling with centrifugal bead separation," Journal of Colloid and Interface Science, 2006, pp. 535-540, vol. 304, Elsevier Inc., USA.

Joni, I Made, et al., "Dispersion Stability Enhancement of Titania Nanoparticles in Organic Solvent Using a Bead Mill Process," *Ind. Eng. Chem. Res.*, 2009, pp. 6916-6922, vol. 48, No. 15, American Chemical Society, USA (published on the web Jul. 13, 2009).

Takeda, Masayoshi, et al., "High-concentration Transparent TiO$_2$ Nanocomposite Films Prepared from TiO$_2$ Nanoslurry Dispersed by Using Bead Mill," *Polymer Journal*, 2008, pp. 694-699, vol. 40, No. 8, The Society of Polymer Science, JP.

Takeda, Masayoshi, et al., "Preparation of Nanocomposite Microspheres Containing High Concentration of TiO$_2$ Nanoparticles via Bead Mill Dispersion in Organic Solvent," *Chemistry Letters*, 2009, pp. 448-449, vol. 38, No. 5, The Chemical Society of Japan, JP.

Thompson, Tracy L., et al., "Surface Science Studies of the Photoactivation of TiO$_2$ -New Photochemical Processes," Chem. Rev., 2006, pp. 4428-4453, vol. 106, No. 10, American Chemical Society, USA (published on the web Oct. 11, 2006).

Uzunova-Bujnova, M., et al., "Effect of the mechanoactivation on the structure, sorption and photocatalytic properties of titanium dioxide," *Materials Chemistry and Physics*, 2008, pp. 291-298, vol. 110, Elsevier B.V., The Netherlands.

Parker, John, "Next-generation abrasive particles for CMP", Solid Technology, Dec. 2004, pp. 30-31.

Jensen, Henrik, et al, "Characterization of nanosized partly crystalline photocatalysts", Journal of Nanoparticle Research 6, 2004, pp. 519-526.

"Information Sheet—Cleaning and maintenance of laminate flooring in commercial areas created on behalf of the EPLF," Sep. 22, 1999, 5 pages, European Producers of Laminate Flooring, Bielefeld, DE.

Mills, A., et al., "An intelligence ink for photocatalytic films," *Chem. Commun.*, published as an Advance Article on the web Apr. 14, 2005, pp. 2721-2723, The Royal Society of Chemistry, www.rsc.org.chemcomm.

Nussbaumer, René J., et al., "Synthesis and characterization of surface-modified rutile nanoparticles and transparent polymer composites thereof," *Journal of Nanoparticle Research*, Aug. 1, 2002, pp. 319-323, vol. 4, No. 4, Kluwer Academic Publishers, NL.

"Transparent Pigments," *Kirk-Othmer Encyclopedia of Chemical Technology, Fourth Edition*, 1996, vol. 19, pp. 36-37, John Wiley & Sons, Inc., NY, US.

Jang, Hee Dong, et al., "Effect of particle size and phase composition of titanium dioxide nanoparticles on the photocatalytic properties," Journal of Nanoparticle Research, Jan. 1, 2001, pp. 141-147, vol. 3, Kluwer Academic Publishers, NL.

Caseri, Walter, "Nanocomposites of polymers and metals or semiconductors: Historical background and optical properties," Macromol. Rapid Commun., Jan. 1, 2000, pp. 705-722, vol. 21, No. 11, Wiley-VCH Verlag GmbH, Weinheim, DE.

Mandzy, N., et al., "Breakage of TiO$_2$ agglomerates in electrostatically stabilized aqueous dispersions," Powder Technology, Dec. 6, 2005, pp. 121-126, vol. 160, No. 2, Elsevier Sequoia, Lausanne, CH.

Wu, Shu-Xin, et al., "XPS Study of Copper Doping TiO2 Photocatalyst," Acta. Phys.-Chim. Sin., Oct. 2003, pp. 967-969, vol. 19(10), CN.

Persson, Hans, et al., U.S. Appl. No. 14/494,957, entitled "Method of Applying a Photocatalytic Dispersion," filed in the U.S. Patent and Trademark Office on Sep. 24, 2014.

Arin, Melis, et al., "Inkjet printing of photocatalytically active TiO$_2$ thin films from water based precursor solutions," 28 pages; also found in *Journal of the European Ceramic Society*, Jun. 2011, pp. 1067-1074, vol. 31, Issue 6, Science Direct, Elsevier B.V. (Rec'd Aug. 27, 2010, Rev. Dec. 10, 2010, Acc Dec. 21, 2010).

Kim, Seong-Jim, et al., "Aqueous TiO$_2$ suspension preparation and novel application of ink-jet printing technique for ceramics patterning," *Journal of Materials Science Letters*, 1998, pp. 141-144, vol. 17, Chapman & Hall, London, England.

Kuscer, Danjela, et al., "Formulation of an Aqueous Titania Suspension and its Patterning with Ink-Jet Printing Technology," *J Am Ceram Soc.*, 2012, pp. 487-493, vol. 95, No. 2, Blackwell Publishing Inc on behalf of the American Ceramic Society, USA.

Raimondo, Mariarosa, et al., Photocatalytic Ceramic Tiles: Key Factors in Industrial Scale-Up (and the Open Question of Performance), Qualicer 2012, pp. 1-14, Castellón, Spain.

Schmidt, Helmut K., et al., "Application of spray techniques for new photocatalytic gradient coatings on plastics," *Thin solid films*, Apr. 28, 2006, vol. 502, Issues 1-2, pp. 132-137, Elsevier B.V., NL.

Thilagan Palaniandy, Samayamutthirian, "A Study on Ultra Fine Grinding of Silica and Talc in Opposed Fluidized Bed Jet Mill," PhD Thesis, 2008, 48 pages, Universiti Sains Malaysia, http://eprints.usm.my/view/creators/Thilagan_Palaniandy=3ASamayamutthirian=3A=3A.html.

International-Type Search Report issued in DK 2012/70126, Jul. 24, 2012, European Patent Office, Rijswijk, NL, 4 pages.

Extended European Search Report issued in EP Application No. 13 764 224.5, Dec. 18, 2015, European Patent Office, Munich, DE, 8 pages.

* cited by examiner

PHOTOCATALYTIC COMPOSITION

FIELD OF THE INVENTION

The present invention relates to formulation of a photocatalytic composition capable of producing colour fast stable and photocatalytic active products. The present invention also relates to a coating of such a photocatalytic composition, a method for applying such a photocatalytic composition, and a building panel having photocatalytic properties.

BACKGROUND

Photocatalytic materials such as $TiO_2$ are used in many applications to obtain self-cleaning and air cleaning properties. The largest obstacle with photocatalytic materials is the scaling up to make large industrial productions. Ink jet printing technology is an economic way to apply functional materials using water-based suspensions or solvent-based suspensions. Ink jet printing is a non-contact deposition method, which can be used to obtain large area coverage with direct patterning on almost any substrate. The advantages of using ink jet printing are simplicity, low cost, less material waste, less environmental issues with spray aerosols and control of the coating.

Furthermore, materials and coatings with lasting performances, which are preserved over time, has been lacking. One drawback of using photocatalytic active $TiO_2$ in for example building materials has been the lack of colour fastness and the change of colour upon light exposure. In the paper and the laminate industry $TiO_2$ is an often used pigment but special grades of $TiO_2$ with no or reduced photocatalytic activity are needed as photocatalytic $TiO_2$ photogrey when exposed to light. Photogreying is an important quality property of pigment $TiO_2$ used in the décor and paper industry and photogreying is of great practical importance because it can affect the colour of products such as paints, polymers, and cosmetics.

Photogreying is showing as the colour of $TiO_2$ changes from white to dark violet upon light exposure. It has been suggested that photogreying is caused by reduction of $TiO_2$ (probably from $Ti^{4+}$ to $Ti^{3+}$) during light irradiation in the absent of oxygen.

Figure 1:
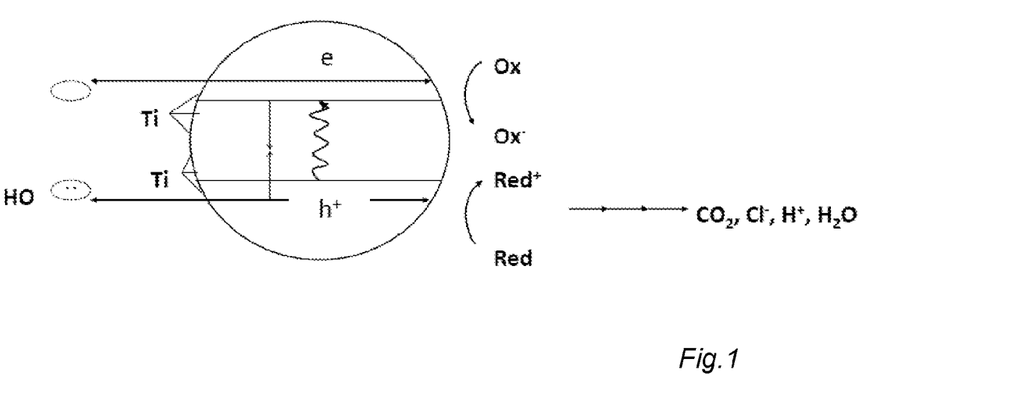
FIG. 1 shows a photocatalytic process of titanium dioxide.

The process of photogreying can be explained by examining the photocatalytic properties of $TiO_2$, which is shown in FIG. 1. When $TiO_2$ is irradiated with light with a wavelength shorter than the band gap the absorbed photon can generate an electron/hole pair. Normally the electron travels in the conduction band to the surface where a reduction occurs. In most cases oxygen is reduced by the electron. In low oxygen environment, for example in a melamine formaldehyde resin matrix, the electron cannot be taken by oxygen and travels to the Ti-centre and creates $Ti^{3+}$ centre. $Ti^{3+}$ centres are purple/blue and create a blue toning of the product. This mechanism is known as photogreying. In for example laminates the high degree of polymerization and density of melamine formaldehyde resin makes the diffusion of oxygen and moisture from the surrounding environment very slowly and the oxidization of grey $Ti^{3+}$ ions to the white $Ti^{4+}$ ions becomes slow. However, the photo reduction of $Ti^{4+}$ to $Ti^{3+}$ is fast and thereby the laminate boards and panels become grey. Another important aspect with laminate boards and panels are the release of formaldehyde during curing. Formaldehyde is known to be a strong reduction agent and formaldehyde in the matrix can lower the overall partial pressure of oxygen and enhance photogreying. When the laminate boards and panels are stored in dark the photocatalytic reduction step is inhibited and within several days up to weeks the slow oxidation step turns the panels back to the original colour.

The photogreying process is reversible and oxygen is known to reverse the photogreying process but the change from dark violet colour to the original colour is much slower than the reverse reaction.

Within paper, décor paper, laminate flooring, laminate panels, foil and film industry photogreying is an important practical problem as the presence of cellulose and melamine formaldehyde resin enhances the photogreying of $TiO_2$. Formaldehyde has been shown to enhance photogreying. For example in a melamine formaldehyde resin matrix in a laminate floor, the dark violet $Ti^{3+}$ ions created by light exposure are relative stable as the partial pressure of oxygen is very low. The increasing $Ti^{3+}$ concentration in the system results in greying of the product. Therefore, $TiO_2$ grades for paper and laminates are surface modified as to be able to eliminate the greying. The $TiO_2$ grades for laminates are surface coated to inhibit the photocatalytic cycle and thereby suppress photogreying of the products.

Various methods and techniques have been developed to overcome photogreying of $TiO_2$ pigmented products. Common for all of these techniques are that photogreying is eliminated by inhibiting the photocatalytic process, and thereby inactivating the photocatalytic properties of $TiO_2$.

SUMMARY OF THE INVENTION

It is an object of embodiments of the present invention to provide an improvement over the above described techniques and known art.

A further object of at least certain embodiments of the present invention is to obtain a composition with reduced photogreying and with maintained photocatalytic activity.

A further object of at least certain embodiments of the present invention is to obtain a composition being photocatalytic and colour stable.

A further object of at least certain embodiments the present invention is to formulate a photocatalytic composition that is stable regarding colour changes upon light exposure and weathering.

A further object of at least certain embodiments the present invention is to provide a photocatalytic composition, which can be applied by digital printing.

At least some of these and other objects and advantages that will be apparent from the description have been achieved by a photocatalytic composition according to a first aspect of the invention. The photocatalytic composition comprises photocatalytic titanium dioxide particles being dispersed in a continuous phase, and at least one anti-photogreying additive. In a preferred embodiment, the photo greying index of said composition is smaller than 6, such as smaller 5, preferably smaller than 4, such as smaller than 3, such as smaller than 2.

In embodiments, said at least one anti-photogreying additive is adapted to reduce photogreying while the photocatalytic activity of the composition is essentially maintained. In one embodiment, the photocatalytic activity is maintained to a level of at least 90%.

Composition herein is referred to also as suspension or as dispersion as a system in which particles are dispersed in a continuous phase of a different composition or state.

The photocatalytic composition may be used as a photocatalytic coating fluid or a photocatalytic ink.

An advantage of embodiments of the present invention is that it is possible to reduce photogreying but at the same time essentially maintain the photocatalytic activity of the composition, and thereby also provide a photocatalytic coating formed by the composition with reduced photogreying while essentially maintaining the photocatalytic properties.

It has been found that certain additives may be added to a $TiO_2$ formulation and thereby suppress photogreying while essentially maintaining the photocatalytic activity. Additives suitable for reducing photogreying may be, but are not limited to, a surfactant with a polar and a non-polar part. Whereas additives with the group of glycerine and for example PEG-200, which are often used additives within ink formulation, enhance photogreying.

In embodiments, the additives suitable for reducing photogreying, i.e. the anti-photogreying additives, may be adapted to temporarily coat the photocatalytic titanium dioxide particles of the composition. The anti-photogreying additive is preferably not chemically bonded to the photocatalytic titanium dioxide particles. A sterical stabilisation between the anti-photogreying additive and the photocatalytic titanium dioxide particles may occur, and/or the anti-photogreying additive may electrostatically coat the photocatalytic titanium dioxide particles. Thereby, a temporary coupling may be obtained.

In embodiments, the anti-photogreying additive may function so that when the photocatalytic titanium dioxide particles are arranged in a matrix such as resin matrix or lacquer matrix, thus being a low oxygen environment, the particles remain coated and the photogreying is reduced. However, the photocatalytic titanium dioxide particles arranged on the surface of a substrate are subjected to external influence such as wear, application of water applied, etc., which may break the temporary coupling. By breaking the temporary coupling, the photocatalytic activity is activated. Thereby, the photocatalytic activity can be controlled to a region of the substrate where the photocatalytic activity is desired, i.e. at the surface of the substrate. The surface of the substrate represents a high oxygen environment. Consequently, photogreying throughout the substrate can be reduced while the photocatalytic activity can be maintained at the surface.

Furthermore, the anti-photogreying additive temporarily coating of the photocatalytic titanium dioxide particles may facilitate orientating the photocatalytic particles at the surface of the composition, such that a major part of the photocatalytic particles are arranged at the surface of the composition when applied to a substrate. The chemical structure of the anti-photogreying additive may orientate the titanium dioxide particles towards the surface of the composition.

The photocatalytic composition may be formulated by adding additives to a $TiO_2$ dispersion that helps with creating an applicable film of the $TiO_2$ mixture that dries up without cracks.

The photocatalytic composition may be produced by mixing suitable additives to a photocatalytic dispersion. The photocatalytic composition may be applied on a substrate by creating a film or coating. The photocatalytic composition may be dried and/or cured without creating cracks in and/or on the film (for example mud cracks).

The photocatalytic composition may be applied by ink jet technology, thereby being a photocatalytic ink. Known art focus on stabilization of ink jet inks and pigments, for example, by adding a polymer to the particles in suspension. The focus has previously been on the stabilization of the pigments or/and particles to create a stable ink that does not sediment. In embodiments of the present invention the focus is towards obtaining a stable coating that also after application of the ink and/or coating fluid on the substrate obtains a lasting performance regarding photocatalytic activity and colour fastness. This is achieved by adding different additives in a controlled manner such as to obtain a colour stable and colour fast coating upon light exposure. Traditionally ink jet technology has been used for applying pigment suspensions and recently also waterborne pigments are used as they are environmental safe materials. The pigments are applied to obtain a decorative coating. Surprisingly, embodiments of the present invention show that it is possible to formulate a long lasting photocatalytic ink that instead of having decorative properties is a transparent coating and which has stable colour and photocatalytic properties.

Said at least one anti-photogreying additive may be present in a concentration higher than 0.1 wt %. By adding an excess amount of an additive, compared to when used as for example a wetting agent, the additive reduces photogreying while the photocatalytic activity is essentially maintained. The anti-photogreying additive may be present in an amount being sufficient to temporarily coat the titanium dioxide particles.

Said at least one additive may be present in the range of 1-35 wt %, preferably 1-15 wt %, more preferably 5-12 wt %.

Said at least one additive may comprise a wetting agent.
Said at least one additive may comprise a surfactant.
Said surfactant may be or comprise a non-ionic surfactant.
Said surfactant may be or comprise a silicone based surfactant.
Said at least one additive may comprise oligomers or polymers.
Said at least one additive may comprise a polyglycol, preferably poly(ethylene glycol) methyl ether. The polyglycol also function as a humectant. The polyglycol may be present in the range of 1-35 wt %, preferably 5-35 wt %.

The titanium dioxide particles may be in anatase form.
The titanium dioxide particles may have a primary size in the range between 5 to 250 nm, preferably between 5 to 100 nm, more preferably between 5 to 50 nm, most preferably between 5 and 30 nm. The titanium dioxide particles may have an agglomerate size of <300 nm<200 nm<100 nm, such as <80 nm preferably an aggregate size of <60 nm such as of <40 nm and even more preferably an aggregate <30 nm such as <20 nm.

The photonic efficiency of the composition may be exceeding 0.025%, preferably exceeding 0.05%, more preferably exceeding 0.1%.

The continuous phase may be a solvent, preferably water.
The titanium dioxide particles may have a concentration in the range between 0.3 wt % to 40 wt %, preferably between 1.0 wt % to 30 wt %.

The composition may have a pH higher than 9. The pH of the composition may be stabilized by amines, such as triethylenamine.

The composition may have a pH lower than 4. The pH of the composition may be stabilized by a strong acid such as HCl.

The photocatalytic composition may further comprise a dispersion agent, preferably propylene glycol.

The photocatalytic composition may further comprise a binder, preferably a silicon or titanium based material.

The photocatalytic composition may be or form a photocatalytic ink. The photocatalytic composition is printable by means of digital printing, preferably by an ink jet printer.

The photocatalytic composition may further comprise a humectant.

The humectant may comprise amines based compounds such as triethanolamine.

The humectant may comprise compounds having a diol group.

The humectant may comprise glycols, preferably poly (ethylene glycol) methyl ether.

The humectant may be present in the range of 1-35 wt %, preferably 5-35 wt %.

The colour change ($\Delta E$) index of the composition may be smaller than 6, such as smaller 5, preferably smaller than 4, such as smaller than 3, such as smaller than 2.

The yellowing ($\Delta B$) index of said composition is smaller than 6, such as smaller 5, preferably smaller than 4, such as smaller than 3, such as smaller than 2.

According to a second aspect of the invention, a photocatalytic coating formed of a composition according to the first aspect of the invention is provided. The second aspect of the invention may incorporate some or all the advantages of the first aspect of the invention, which previously have been discussed, whereby the previous discussion is applicable also for the coating.

The coating may be provided on a substrate, for example a building panel such as a floor panel or wall panel. The coating may be applied on a surface or a surface layer of a substrate. The surface layer may be a lacquer layer. The surface layer may comprise a binder containing formaldehyde such as melamine formaldehyde resin. The surface layer may be a melamine formaldehyde resin impregnated paper. The surface layer may be a wood powder layer comprising wood fibres and a binder, preferably melamine formaldehyde.

According to a third aspect of the invention, a method for applying a composition according to the first aspect of the invention on a substrate is provided. The method may comprise applying said composition on a substrate for forming a coating, and drying and/or curing said coating.

The composition may be applied by digital printing, preferably by means of an ink jet printer.

According to a fourth aspect of the invention, a building panel is provided. The building panel may have a surface comprising photocatalytic titanium dioxide particles and at least one anti-photogreying additive, and wherein the photo greying index ($\Delta L$) of the surface may be less than 6, such as less 5, preferably less than 4, such as less than 3, such as less than 2. The surface of the building panel is preferably coated with a photocatalytic composition of the type described above. The building panel may have a surface or a surface layer, and a coating comprising photocatalytic titanium dioxide particles and at least one anti-photogreying additive. The surface layer may be a lacquer layer. The surface layer may comprise a binder containing formaldehyde such as melamine formaldehyde resin. The surface layer may be a melamine formaldehyde resin impregnated paper.

According to a fifth aspect of the invention, a photocatalytic ink composition is provided. The photocatalytic ink composition may comprise photocatalytic titanium dioxide particles and a humectant. The humectant may be a glycol, preferably poly(ethylene glycol) methyl ether. The photocatalytic titanium dioxide particles may have a primary size in the range between 5 to 250 nm, preferably between 5 to 100 nm, more preferably between 5 to 50 nm, most preferably between 5 to 30 nm. The titanium dioxide particles may have an agglomerate size of <300 nm<200 nm<100 nm, such as <80 nm preferably an aggregate size of <60 nm such as of <40 nm and even more preferably an aggregate size <30 nm such as <20 nm.

According to a sixth aspect of the invention, a method for providing a photocatalytic coating on a substrate is provided. The method may comprise applying a photocatalytic composition comprising photocatalytic titanium dioxide particles and a humectant by means of digital printing on a substrate, and drying and/or curing said composition for forming a photocatalytic coating. The printing is preferably made by an ink jet printing device. The humectant may be a glycol, preferably poly(ethylene glycol) methyl ether. The photocatalytic titanium dioxide particles may have a primary size in the range between 5 to 250 nm, preferably between 5 to 100 nm, more preferably between 5 to 50 nm, most preferably between 5 to 30 nm. The titanium dioxide particles may have an agglomerate size of <300 nm<200 nm<100 nm, such as <80 nm, and preferably an aggregate size of <60 nm, such as of <40 nm, and even more preferably an aggregate size <30 nm, such as <20 nm. The substrate may a building panel, for example, a floor panel. The building panel may comprise a surface layer on which the photocatalytic composition is applied by digital printing. The surface layer may be a lacquer layer. The surface layer may be a resin impregnated paper, preferably a melamine formaldehyde resin impregnated paper. The surface layer may be wood powder layer comprising wood fibres and a binder, preferably melamine formaldehyde.

In particular, embodiments of the present invention relate to a method, which allows for production of photocatalytic products without photogreying but with essentially maintained photocatalytic activity. It has been found that it is possible to reduce or eliminate photogreying but at the same time essentially maintain a photocatalytic active product. It was found that a non-photogreying product can be produced by controlling the coating formulation, the procedure of coating the substrate and by controlling the treatment of the coated substrate.

BRIEF DESCRIPTION OF THE DRAWINGS

The present invention will by way of example be described in more detail with reference to the appended schematic drawings, which show embodiments of the present invention.

DETAILED DESCRIPTION

A photocatalytic composition according to certain embodiments will now be described in more detail. The photocatalytic composition comprises photocatalytic TiO$_2$ particles in dispersion. The photocatalytic $TiO_2$ are preferably in anatase phase. The photocatalytic dispersion may be dispersed in a solvent, preferably water. The concentration of photocatalytic $TiO_2$ particles in the dispersion is preferably in the range 0.3 wt % to 40 wt %, more preferably in the range 1.0 wt % to 30 wt %.

In an embodiment, the photocatalytic particles may be doped with non-metals and/or metals. The $TiO_2$ particles may be doped with non-metals and/or elements such as but not limited to the list of C, N, F, S, Mo, V, W, Cu, Ag, Au, Pt, Pd, Fe, Co, La, Eu, $WO_2$, and PdO or a combination thereof.

The photocatalytic $TiO_2$ particles may be nanosized $TiO_2$ particles. The $TiO_2$ may have a size in the range from 5-250 nm, preferably in the range 5-100 nm, more preferably in the range 5-50 nm, most preferably in the range of 5-30 nm.

The photocatalytic composition may be stabilized by pH and/or a dispersant agent. The photocatalytic composition may be stabilized at pH >9 by preferably, but not limited to, amines, for example triethylenamine. The photocatalytic composition may also be stabilized at pH<4 by preferably, but not limited to, a strong acid like HCl. The photocatalytic dispersion may further be stabilized by a dispersion agent to keep the particles in suspension and from re-agglomerating. The dispersion may be stabilized by, but not limited to, propylene glycol. In an embodiment, binders are added to the photocatalytic composition to enable and to improve the adhesion of the $TiO_2$ particles to the substrate on which the composition is applied. Preferably these binders are non-photocatalytically degradable in the group of preferably, but not limited to, silanes, siloxanes, silicones, $SiO_2$, surface modified $SiO_2$, amorphous $TiO_2$, alkoxides, Ti-alkoxides, Si-alkoxides, UV curable binders and heat curable binders.

In a preferred embodiment, the photocatalytic composition is a stable nanosized $TiO_2$ dispersion in water with a size in suspension of said photocatalytic particles of less than 50 nm in concentration of said $TiO_2$ particles up to 40 wt %.

Additives may be added to the photocatalytic composition in order to, for example, enhance the coating and film formation properties and to improve the colourfastness upon light exposure. Additives may be added to the photocatalytic composition as to improve the coating and/or application properties of the photocatalytic composition. Additives may also be added to the photocatalytic composition to improve sprayability. Examples of such additives are humectants. Furthermore, wetting agents may be added to the photocatalytic composition to enhance the wetting of the photocatalytic composition on a substrate. An example of such wetting agent may be, but not limited to, the group of polyether modified siloxanes silicone surfactant such as polyether modified siloxanes.

In a preferred embodiment, the photocatalytic composition is adjusted to be able to reduce photogreying. One or more additives may be added to the photocatalytic composition to reduce photogreying of the photocatalytic particles upon light exposure.

Figure 2A:
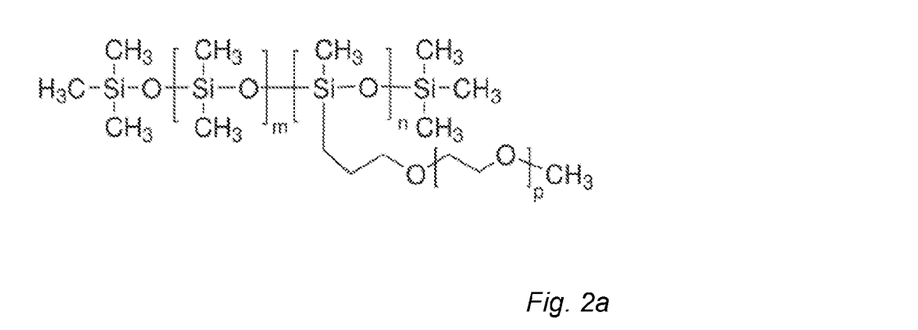
FIG. 2a shows an example of a non-ionic surfactant in form of a polyether modified polysiloxane.

In one embodiment, it was surprisingly found that by adding excess amount (compared to acknowledged recommended quantity of appr. 0.1 wt %) of an additive such as a wetting agent, it was possible to formulate a photocatalytic composition which may be applied on a substrate such as paper, overlay paper, décor paper, foil, or film without experiencing photogreying or with at least reduced photogreying. The additive thereby forms an anti-photogreying additive. The anti-photogreying additive may be chosen from the group of silicone surfactants such as polyether modified siloxanes as shown in FIG. 2a. By adding an excess amount of the additive, the additive provides an anti-photogreying properties.

The anti-photogreying additive may be a non-ionic surfactant.

The anti-photogreying additive may be a silicone surfactant, preferably a non-ionic silicone surfactant. More preferably, the anti-photogreying additive may be a polyether modified siloxanes. More preferably, the anti-photogreying additive may be a polyether modified polysiloxanes. More preferably, the anti-photogreying additive may be a polyether modified polymethyl siloxane. As an alternative, the anti-photogreying additive may be polydimethylsiloxane co-polymer.

Figure 2B:
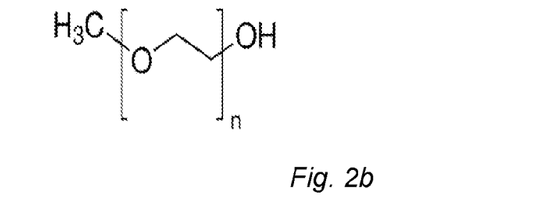
FIG. 2b shows an example of a non-ionic surfactant in form of a poly(ethylene glycol) monomethyl ether.

In a further embodiment, the anti-photogreying additive may be a polyglycol, preferably poly(ethylene glycol) methyl ether as shown in FIG. 2b.

Figure 2C:
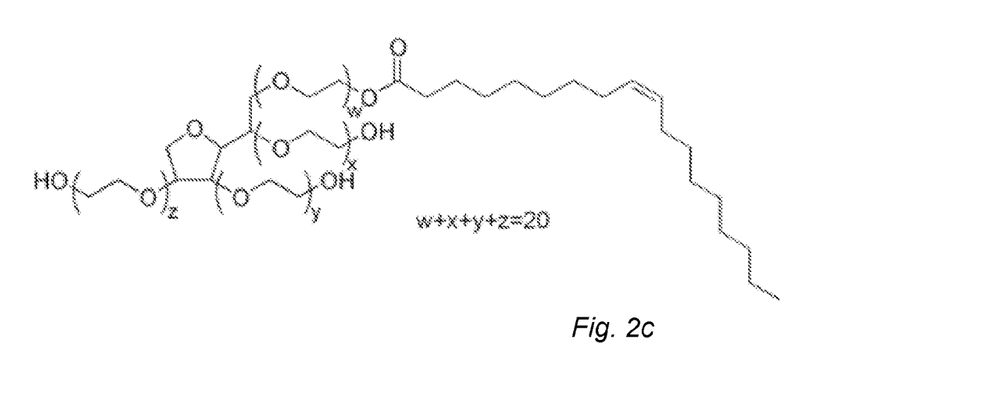
FIG. 2c shows an example of a non-ionic surfactant in form of a polyoxyethylene sorbitan.

In a further embodiment, the anti-photogreying additive may be a polyoxyethylene sorbitan as shown in FIG. 2c, preferably polyoxyethylene (20) sorbitan. Preferably, the anti-photogreying additive may be a polyoxyethylene (20) sorbitan monooleate.

In a further embodiment, the anti-photogreying additive may be polyvinyl alcohol (PVA) and/or polyvinyl pyrolidon (PVP), and/or poly(ethylene glycol) methyl ether, preferably combined with a wetting agent.

The anti-photogreying additive is added in an excess amount compared to conventional amounts of additives in order to obtain its anti-photogreying properties. In a preferred embodiment, the anti-photogreying additive may be added in the range of 1-35% by weight of the composition, preferably 5-35% by weight of the composition such as 1-15% by weight of the composition. More preferably, the anti-photogreying additive may be added in the range 5-12% by weight of the composition.

For a wetting agent acting as an anti-photogreying additive, the wetting agent may be added in an amount of 5×, or 10× or 100× the amount needed to achieve a wetting effect.

A de-foaming agent may be added to the photocatalytic composition to suppress foaming.

In one embodiment, the photocatalytic composition is formulated to a photocatalytic coating fluid for spray coating, float coating, impregnation by roller coat application, or printer roll application of, for example, paper, décor paper, overlay paper, foils or films.

In one embodiment, the photocatalytic composition is formulated to a photocatalytic ink to be applied by for example an ink jet printer. The photocatalytic ink may be colour and/or weathering stable. The photocatalytic ink may include pigments or may be colourless.

Density, surface tension and viscosity of the fluid are the properties that show the strongest dependence on the ink jet application and spreading of droplets on the substrate. The printability range of an ink can be estimated based as the inverse Ohnesorge number:

$$Z=(\alpha \cdot \rho \cdot \gamma)^{1/2}/\eta$$

Where $\alpha$ is the nozzle diameter, $\rho$ is the diameter of the ink, $\gamma$ is the surface tension of the ink and $\eta$ is the viscosity of the ink.

In an embodiment, the Ohnesorge number is in the range of $1 \leq Z \leq 30$ and, more preferably in the range of $1 \leq Z \leq 20$ of the photocatalytic ink.

In a further embodiment, the photocatalytic composition to be used as a photocatalytic ink has a viscosity below 25 cP.

Controlling drying of the photocatalytic coating or photocatalytic ink formed by the photocatalytic composition facilitates obtaining a good final coating and/or film without cracks. The drying has to be controlled to avoid both drying in the printing head and/or nozzle tip of the ink jet printer, and to minimise stain deposit effect which yields an uneven deposit with cracks. An additive, such as a humectant or drying agent, is often added to avoid drying within a spray nozzle or printing nozzle. Often used humectant is glycerol; however, glycerol has shown to be enhancing photogreying when the photocatalytic composition or ink is applied on substrates with tendencies for photogreying. In a preferred embodiment, a humectant is added to the photocatalytic composition and/or photocatalytic ink to control the drying of the mixture in the nozzle and on the substrate. In a preferred embodiment, the humectant is chosen such as to prevent or at least reduce photogreying.

In an embodiment, the humectant is chosen from the group of triethanolamine.

In an embodiment, the humectant is chosen from the group of 3-methyl-1,5-pentanediol.

In an embodiment, a humectant is chosen the group of glycols such as of the group of triethylene glycol, and/or propylene glycol, and/or diethylene glycol, and/or ethylene glycol, and/or poly(ethylene glycol) methyl ether.

In an embodiment of the present invention, the humectant is added in the range of 1-35 wt %, preferably 5-35 wt %.

In an embodiment, an additive is chosen that has both anti-photogreying properties and functions as a humectant. An example of such an additive is poly(ethylene glycol) methyl ether, both being a humectant and an anti-photogreying additive. An additive such as poly(ethylene glycol) methyl ether may be added in the range of 1-35 wt %, preferably 5-35 wt %.

The photocatalytic composition may be applied on a substrate or in a substrate matrix. To be able to create a photocatalytic coating or film that is colour stable against light and/or weathering it has been found that is useful to make a film or coating without cracking, like for example mud cracking.

"Mud cracking" means the occurrence of cracks during the drying phase of paint films, as opposed to crack formation, which can occur through exposure and ageing of the films.

In a preferred embodiment, the film formation process is to be controlled to obtain a non-cracking coating or film. In the coating or application process the time to create a film ($t_{open}$) may be shorter than the time before drying or curing occurs. Thereby, the applied photocatalytic composition has time enough to create a wet film or coating before the wet film or coating start to dry up.

Figure 3:
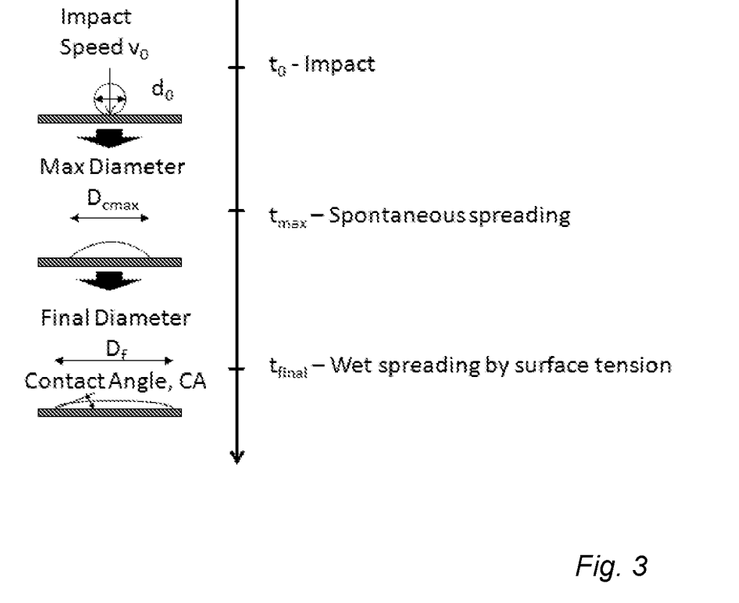
FIG. 3 shows a wetting process of a composition or coating fluid on a substrate.

"$t_{open}$" is the time of full wetting of the substrate by the coating fluid from the impact of the droplet on the substrate to full wetting of the substrate. $t_{open} = t_{final} - t_0$ as illustrated in FIG. 3.

In a preferred embodiment, $t_{open}$ is less than 15 seconds, preferably less than 10 seconds, more preferably less than 5 seconds.

In an embodiment, mud cracking may be avoided by adding film forming auxiliary materials. The film forming auxiliary materials and the photocatalytic composition have to be individual adjusted to one another. In a preferred embodiment, the film forming materials are chosen from the group of anti-photogreying additives described above.

Furthermore, the photocatalytic composition to be coated or applied on a substrate may be formulated to be able to wet the surface and thereby be able to create a film. Preferably, the photocatalytic composition may have a surface tension which enables a wetting of the surface. More preferably, the surface tension is equal or less than the critical surface tension of the substrate to create a good wetting and create a wet coating or film.

It has been discovered that perfect wetting occurs at the point which the surface energy and surface tension are equivalent, and that liquids with low surface tensions wet solids with high surface energies.

In a preferred embodiment, the photocatalytic composition forming a coating or ink has a surface tension smaller than 50 mN/m, preferably less than 40 mN/m, more preferably less than 30 mN/m, and more preferably equal to or less than 25 mN/m.

In an embodiment, the surface tension of said photocatalytic composition forming a coating or ink may be achieved by adding an additive from the group of anti-photogreying additives described above. In a further embodiment, the surface tension of the photocatalytic composition forming a coating or ink may be achieved by adding an additive from the group of anti-photogreying additives and adding a wetting agent to the photocatalytic composition forming the coating or ink.

In one embodiment, the photocatalytic composition forming a coating or ink may be used to impregnate overlay paper and/or décor paper and/or cellulose paper. The surface tension may be equal to or less than 24 mN/m to create a perfect wetting of the substrate.

In a preferred embodiment, minimum volume of the photocatalytic composition forming a coating or ink is enough to ensure a full wetting of the surface creating a wet film with homogenous covering of the substrate to be coated on and/or impregnated in said matrix.

In one embodiment, the photocatalytic composition is applied by spraying. The photocatalytic composition can be sprayed by nozzles yielding a droplet size small enough to give a homogenous coating. Application droplets of the photocatalytic composition is preferably smaller than 500 μm, more preferably smaller than 250 μm even more preferably smaller than 100 μm and preferably equal to or smaller than 50 μm.

In a preferred embodiment, application of micronized droplets of the photocatalytic composition is obtained by using air-mixed nozzles. In another embodiment, application of micronized droplets of the photocatalytic composition is obtained by using ultrasonic nozzles. In a further embodiment, application of micronized droplets of the photocatalytic composition is obtained by using rotary atomizing nozzle. In a further embodiment, application of micronized droplets of the photocatalytic composition is obtained by using ink jet printer.

In one embodiment, an ink jet printer is used to apply the photocatalytic composition on the substrate or into said substrate matrix.

In a preferred embodiment, the droplets ejected from the nozzles are printed and/or spray coated in an array that ensure an efficient coverage of the substrate. Furthermore, the coverage is in one embodiment made in a way that the inter droplet distance (distance between two neighbouring droplets) in the array is smaller than the wetting capacity of the droplets. Thereby, the inter droplet distance and the spreading of the droplets on the substrate is optimized as to obtain a wet film by overlapping droplets. Furthermore, the diameter of the printed and or spray coated droplets is chosen so as that the inter droplet distance, the spreading of the droplets on the substrate and diameter of each droplet was optimized to obtain a complete wet film.

In one preferred embodiment, the inter droplet distance may be smaller than 5 mm, more preferably smaller than 1 mm, even more preferably smaller than 0.1 mm, and may be smaller than 0.05 mm, smaller than 0.01 mm, and even smaller than 0.001 mm.

In a preferred embodiment, the rheological properties of the photocatalytic composition were chosen so as to obtain a homogenous wet film where the droplets spread easily to form a complete layer on the substrate and that the wet film or layer dries up without inhomogeneities.

In a preferred embodiment, the diameter of the droplets is in the range 1-200 µm, preferably in the range 1-100 µm, and more preferably in the range of 1-50 µm.

In a preferred embodiment, the volume of said droplets are in the range of 1 nL-1 mL.

Controlling drying of the photocatalytic coating and/or photocatalytic ink formed by the photocatalytic composition facilitates obtaining a good final coating and/or film without cracks. The drying has to be controlled to avoid both drying in the printing head and/or nozzle tip and minimizing stain deposit effect which yields an uneven deposit with cracks. Drying of wet films depends on the thickness of the film, drying temperature and drying profile, humidity and film additives such as leveling agents and film formation agents and humectants.

Previously photocatalytic films have been made ranging from room temperature up to for example 140° C. resulting in cracks limiting their usefulness. To be able to control the cracking during drying of the film and/or coatings is useful as cracking limits the thickness, optical properties, mechanical integrity. Furthermore, as shown in the present invention cracking may also facilitate photogreying on substrates with tendencies for photogreying such as but not limited to melamine impregnated papers and cellulose paper.

Cracking during the drying stage of film formation can often be related to mud cracking. The film tension produced in the film forming process is often responsible for the occurrence of mud cracking in emulsion paint films and coatings. The film tension develops more or less spontaneously and can be of varying intensity. The cracking of photocatalytic coatings or films has serious consequences for their potential use in viable commercial applications.

In a preferred embodiment, the formation of uncracked photocatalytic films and/or coatings may be obtained by making said film and/or coating below a critical film thickness. The film thickness is related to the drying conditions and the formulation of said photocatalytic composition. In a preferred embodiment, the film thickness is less than 100 µm, even less than 50 µm, more preferably less than 10 µm, and more preferably less than 1 µm.

In an embodiment, the photocatalytic film and/or coating formed by the photocatalytic composition is dried at a controlled temperature profile. The controlled temperature may in a preferred embodiment be a profile which is adjusted to the film thickness and the formulation of the photocatalytic composition.

In an embodiment, the photocatalytic film and/or coating is applied on a melamine formaldehyde resin impregnated paper. The melamine formaldehyde resin impregnated paper is preferably dry, or semi-dry, such as dried with a relative humidity in the range of 2-10%.

In an embodiment, the photocatalytic film and/or coating formed by the photocatalytic composition is applied on the melamine formaldehyde resin impregnated paper by spray application.

In an embodiment, the photocatalytic film and/or coating formed by the photocatalytic composition is applied on the melamine formaldehyde resin impregnated paper by ink jet printing.

In an embodiment, the photocatalytic film and/or coating formed by the photocatalytic composition is applied by roll coating on the melamine formaldehyde resin impregnated paper.

In a further embodiment, the applied film and or coating has a thickness less than 10 µm and maximum drying temperature in the range 20-160° C.

In a further embodiment, the applied film and or coating may have a thickness of less than 10 µm and drying temperature less than 140° C.

The photocatalytic composition may be used as a photocatalytic ink or as a photocatalytic fluid. When applied to a substrate, the photocatalytic composition forms a coating or film. The photocatalytic coating or film may be continuous over the substrate, or discontinuous.

Figure 4:
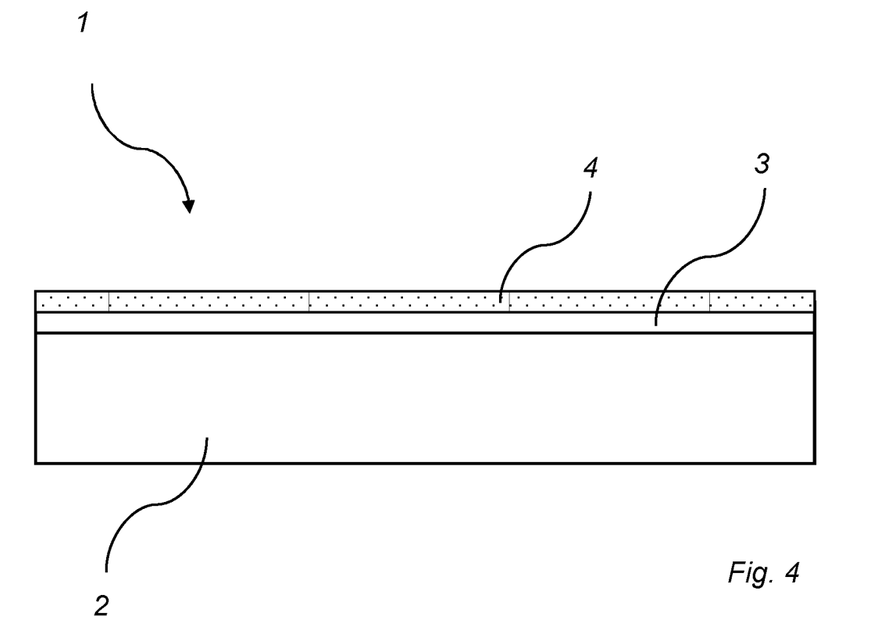
FIG. 4 shows a substrate having a coating formed by the photocatalytic composition.

FIG. 4 shows a substrate 1 such as a building panel having a core 2 and a surface layer 3 coated by a photocatalytic coating 4 formed of the above described photocatalytic composition. The core 2 may be a wood fibre based core such as HDF. The core may comprise a thermoplastic material. The surface layer 3 may be a lacquer layer. The surface layer 3 may comprise a binder containing formaldehyde, such as melamine formaldehyde resin. The surface layer 3 may be a melamine formaldehyde resin impregnated paper. The surface layer may comprise a thermoplastic material. The surface layer 3 may be a wood powder layer comprising wood fibres and a resin, preferably melamine formaldehyde.

The coating may be applied on the surface layer or applied into the surface layer such as into the resin matrix of the surface layer.

The anti-photogreying additive reduces photogreying of the photocatalytic titanium dioxide particles disposed in lacquer layer or resin matrix of the surface layer 3 of the substrate 1.

Even if illustrated as two separate layers, the photocatalytic composition may enter into the underlying surface layer 3 of the substrate 1. However, even if the anti-photogreying additive reduces photogreying of the particles disposed in the surface layer 3, the photocatalytic titanium dioxide particles arranged on the outermost surface of the surface layer 3 remain photocatalytically active.

As an alternative, the composition may be applied into the surface layer before being arranged on the core. As a further alternative, the composition may be added when forming the surface layer. In this embodiment, the photocatalytic coating is integrated in the surface layer. As an example, the photocatalytic composition may be added to a mix comprising wood fibres and a binder.

It is also contemplated that the photocatalytic coating may be applied on a surface of the substrate, i.e. with no intervening layer.

Example 1

Figure 5A:
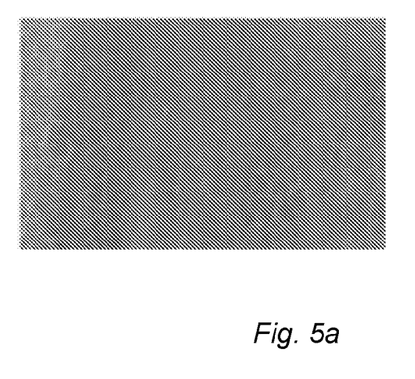
FIG. 5a shows a sample according to example 1A exposed to UVA light.
Figure 5B:
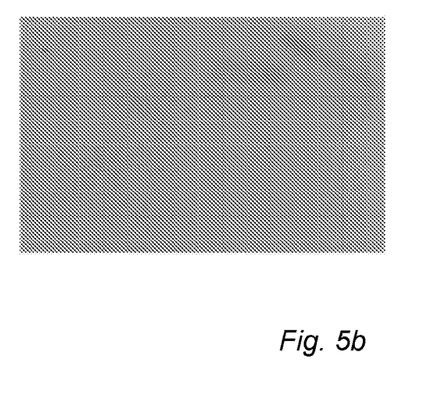
FIG. 5b shows a sample according to example 1B exposed to UVA light.

Application of the photocatalytic composition to form a 10 µm coating on an overlay paper conforming to abrasion class AC6 (EN 13329). Sample A in FIG. 5a shows the overlay paper having a coating formed from a waterborne $TiO_2$ composition comprising 0.5 vol % polyether modified polysiloxanes. Sample B in FIG. 5b shows the overlay paper having a coating formed form a waterborne $TiO_2$ composition comprising 16.6 vol % polyether modified polysiloxanes. Both samples are cured at ambient conditions and irradiated with 1 $mW/cm^2$ UVA light.

FIG. 5a shows sample A after UV irradiation. FIG. 5b discloses sample B after UV irradiation. Photogreying has occurred of sample A. Sample A also shows mud cracking. Sample B shows no photogreying and no mud cracking.

Example 2

Colour and Contact Angle (CA) were measured as a function of time of UVA exposure (ISO) for a reference, a thick film of nanofluid with 10 vol % polyether modified polysiloxanes (A) and a thin film of nanofluid with 12 vol % polyether modified polysiloxanes (B). The colour of a blank white reference and samples were recorded with an NCS Colour Scan before and after UVA radiation. The NCS codes were recalculated to RGB and Lab values with NCS Navigator (www.ncscolour.com). The RGB values (RGB) are used to visually present the colour/colour change and the Lab (L*a*b) values are used to calculate the Greying and the Yellowing Index.

The Photogreying index $\Delta L^* = L^*_{(Initial)} - L^*_{(X\ min)}$
The Yellowing index $\Delta b^* = abs(b^*_{(Ref)} - b^*_{(Sample)})$

| | Time | | | | | | | | | | | |
|---|---|---|---|---|---|---|---|---|---|---|---|---|
| | 0 hr | | | 16.5 hr | | | 39 hr | | | 60 hr | | |
| | CA | Δb | ΔL | CA | Δb | ΔL | CA | Δb | ΔL | CA | Δb | ΔL |
| Reference | 52.4 | 0 | 0 | 60.4 | 0 | 0 | 64.4 | 2 | 0 | 62.6 | 2 | 0 |
| A | 11.8 | 6 | 0 | 55.9 | 8 | 1 | 49.5 | 9 | 2 | 42.2 | 9 | 2 |
| B | 11.9 | 2 | 0 | 68.7 | 2 | 0 | 63.6 | 2 | 1 | 51.7 | 2 | 1 |

Example 3

Colour and Contact Angle (CA) were measured as a function of time of UVA exposure (ISO) for a reference, a thin film with 0.5 vol % polyether modified polysiloxanes (A), a thin film of nanofluid with 12 vol % polyether modified polysiloxanes (B), and a thin film $TiO_2$ particles modified with Pt with 6 vol % polyether modified polysiloxanes (C).

| | Time | | | | | | | | | | | |
|---|---|---|---|---|---|---|---|---|---|---|---|---|
| | 0 hr | | | 16.5 hr | | | 39 hr | | | 60 hr | | |
| | CA | Δb | ΔL | CA | Δb | ΔL | CA | Δb | ΔL | CA | Δb | ΔL |
| Reference | 62.0 | 0 | 2 | 67.0 | 0 | 2 | 69.7 | 2 | 0 | 67.3 | 2 | 0 |
| A | 57.1 | 2 | 0 | 53.2 | 3 | 6 | 54.1 | 3 | 6 | 47.7 | 3 | 6 |
| B | 18.2 | 2 | 0 | 65.7 | 2 | 0 | 47.4 | 2 | 0 | 40.0 | 2 | 0 |
| C | 22.5 | 2 | 0 | 17.1 | 2 | 1 | 14.4 | 2 | 1 | 19.0 | 2 | 1 |

Example 4

Figure 6:
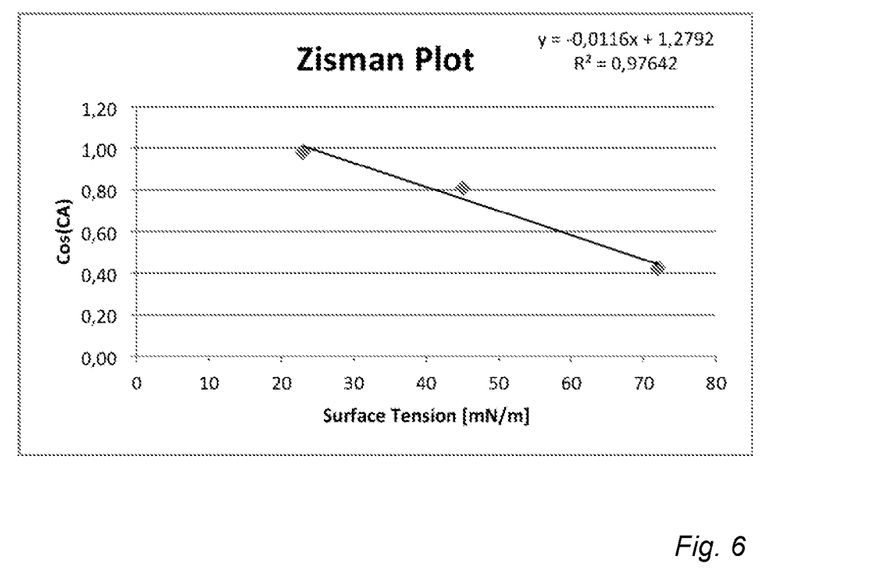
FIG. 6 shows a Zisman plot for three different surface tensions of a photocatalytic composition.

FIG. 6 shows a Zisman plot for three different surface tensions of photocatalytic composition—showing a critical surface tension of overlay paper conforming to abrasion class AC6 (EN 13329) of 24 mN/m. By determining the critical surface tension of the substrate on which the composition is to be applied, a suitable anti-photogreying additive and/or wetting agent may be chosen in order to obtain perfect wetting.

Example 5

$t_{open}$

Figure 7:
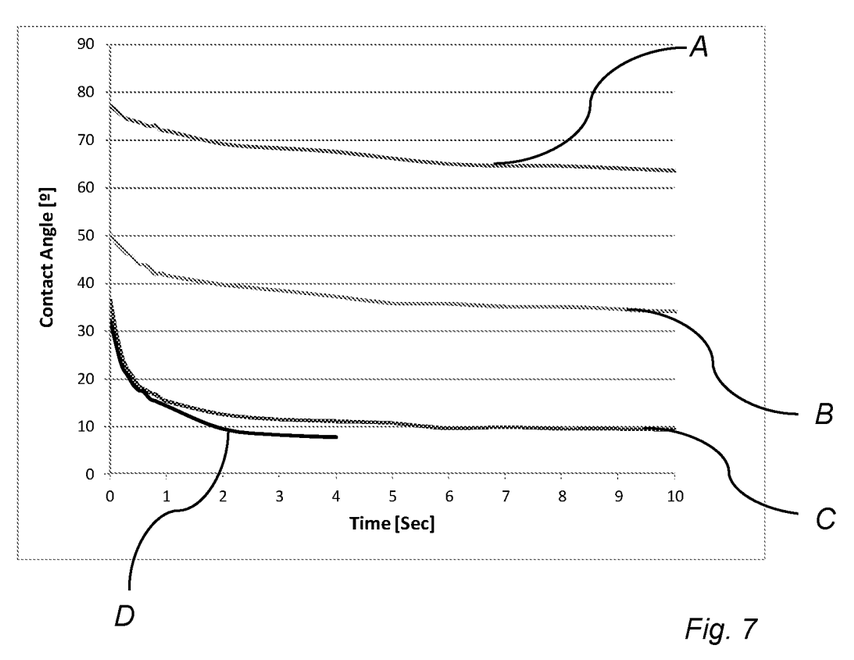
FIG. 7 shows wetting of a surface for four different formulations.

FIG. 7 discloses wetting of surface—$t_{open}$—as described above with reference to FIG. 3 for four different formulations:
A) De-ionized water.
B) Waterborne nanosized $TiO_2$ fluid.
C) Waterborne nanosized $TiO_2$ fluid with 10 wt % polyether modified polysiloxanes.
D) Waterborne nanosized $TiO_2$ fluid with 10 wt % polyethylglycol monomethyl ether and a wetting agent.

Example 6

Photocatalytic Activity

An overlay paper conforming to abrasion class AC6 (EN 13329) was impregnated with 25 wt % nanosized photocatalytic anatase TiO2 composition containing 10 vol % polyether modified polysiloxanes as an anti-photogreying additive. The composition was applied by spray coating on the melamine formaldehyde resin coated overlay paper and a total of 3 g of composition was applied per m2. The melamine impregnated and TiO2 coated overlay paper was pressed together with a decor layer, a core and a backing paper to a laminate structure. The sample was pre-activated in UV light for 3 days where after the photocatalytic activity was measured. The photogreying was measured after 96 hr in Xenon test.

The photocatalytic activity was measured according to ISO 22197-2 (removal of acetaldehyde) with a gas flow rate of 1 L/min with 1 ppm acetaldehyde as pollutant a sample size of 45 cm2 and an UVA light source of 1 mW/cm2.

The photocatalytic activity is measured as removal of pollutant (x ppm) and by the photonic efficiency. The employed UV(A) illumination intensity is 1 mW/cm2, with an illuminated sample area of 45 cm2 the total power is 45 mW. Taking an average illumination wavelength of 350 nm this can be converted to 1.32×10-7 molhv/s. The gas flow contains 1 ppm Acetaldehyde, hence 10-6 mol Acetaldehyde flow across the sample within 24 min. During the same time the sample is illuminated with 1.32×10-7 molhv/s×60 s/min×24 min=190×10-6 molhv. If total oxidation (loss) of the 1 ppm Acetaldehyde is observed, the Photonic Efficiency ζ will be ζ=10-6 mol Acetaldehyde/190×10-6 molhv=0.0053=0.53%. For a measured degraded amount of x ppm Acetaldehyde the Photonic Efficiency can consequently be calculated with the following formula: ζx=x (ppm)*0.53 (%/ppm).

In the table below the results are listed together with the results of a reference of a pressed laminate without photocatalytic TiO2.

| | Ref | Photocatalytic |
|---|---|---|
| ΔL | −1.01 | 0.12 |
| ζx | 0.00% (0.0 ppm) | 0.25% (0.48 ppm) |

The invention claimed is:

1. A photocatalytic composition comprising:
   photocatalytic titanium dioxide particles being dispersed in a continuous phase, and
   at least one anti-photogreying additive being adapted to reduce photogreying while the photocatalytic activity of the composition is substantially maintained, and
   wherein the photogreying index ($\Delta L$) of said composition is less than 6;
   wherein said composition is configured for coating a building panel.

2. A photocatalytic composition according to claim 1, wherein the photocatalytic activity of the composition is maintained to a level of at least 90%.

3. A photocatalytic composition according to claim 1, wherein the photocatalytic activity of the composition is maintained.

4. A photocatalytic composition according to claim 1, wherein said at least one anti-photogreying additive is present in a concentration higher than 0.1 wt %.

5. A photocatalytic composition according to claim 1, wherein said at least one anti-photogreying additive is present in the range of 1-35 wt.

6. A photocatalytic composition according to claim 1, wherein said at least one anti-photogreying additive comprises a wetting agent.

7. A photocatalytic composition according to claim 1, wherein said at least one anti-photogreying additive comprises a surfactant.

8. A photocatalytic composition according to claim 7, wherein said surfactant is or comprises a non-ionic surfactant.

9. A photocatalytic composition according to claim 7, wherein said surfactant is or comprises a silicone based surfactant.

10. A photocatalytic composition according to claim 1, wherein titanium dioxide particles are in anatase form.

11. A photocatalytic composition according to claim 1, wherein said titanium dioxide particles have a size in the range between 5 to 250 nm.

12. A photocatalytic composition according to claim 1, wherein photonic efficiency of the composition is exceeding 0.025%.

13. A photocatalytic composition according to claim 1, wherein said continuous phase is a solvent.

14. A photocatalytic composition according to claim 1, wherein said titanium dioxide particles have a concentration in the range between 0.3 wt % to 40 wt %.

15. A photocatalytic composition according to claim 1, wherein said composition has a pH higher than 9.

16. A photocatalytic composition according to claim 15, wherein said pH is stabilized by amines.

17. A photocatalytic composition according to claim 1, wherein said composition has a pH lower than 4.

18. A photocatalytic composition according to claim 17, wherein said pH is stabilized by a strong acid.

19. A photocatalytic composition according to claim 1, further comprising a dispersion agent.

20. A photocatalytic composition according to claim 1, further comprising a binder.

21. A photocatalytic composition according to claim 1, wherein said composition is a photocatalytic ink.

22. A photocatalytic composition according to claim 1, further comprising a humectant.

23. A photocatalytic composition according to claim 22, wherein said humectant comprises amines based compounds.

24. A photocatalytic composition according to claim 22, wherein said humectant comprises compounds having a diol group.

25. A photocatalytic composition according to claim 22, wherein said humectant comprises glycols.

26. A photocatalytic composition according to claim 22, wherein said humectant is present in the range of 1-35 wt %.

27. A photocatalytic composition according to claim 1, wherein the colour change ($\Delta E$) index of said composition is smaller than 6.

28. A photocatalytic composition according to claim 1, wherein the yellowing ($\Delta B$) index of said composition is smaller than 6.

29. A photocatalytic composition according to claim 1, wherein said at least one anti-photogreying additive comprises a polyglycol.

30. A photocatalytic composition, comprising:
    photocatalytic titanium dioxide particles being dispersed in a continuous phase; and
    at least one anti-photogreying additive being adapted to reduce photogreying while the photocatalytic activity of the composition is substantially maintained;
    wherein the photogreying index ($\Delta L$) of said composition is less than 6; and
    wherein said at least one anti-photogreying additive comprises a polyglycol.

31. A photocatalytic composition according to claim 30, wherein the polyglycol comprises poly(ethylene glycol) methyl ether.

32. A building panel having a surface, wherein the surface comprises photocatalytic titanium dioxide particles and at least one anti-photogreying additive, and wherein the photogreying index ($\Delta L$) of the surface is less than 6.

* * * * *